United States Patent
Tanaka (10) Patent No.: US 10,019,853 B2
(45) Date of Patent: Jul. 10, 2018

(54) SUPPORT SERVER, MOBILE TERMINAL, AND SUPPORT SYSTEM

(71) Applicant: HONDA MOTOR CO., LTD., Tokyo (JP)

(72) Inventor: Ayako Tanaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 14/596,654

(22) Filed: Jan. 14, 2015

(65) Prior Publication Data

US 2015/0213657 A1 Jul. 30, 2015

(30) Foreign Application Priority Data

Jan. 27, 2014 (JP) .................................. 2014-012636

(51) Int. Cl.
 *G07C 5/00* (2006.01)
 *G07C 5/08* (2006.01)
 *G06Q 10/00* (2012.01)
(52) U.S. Cl.
 CPC ............. *G07C 5/008* (2013.01); *G06Q 10/00* (2013.01); *G07C 5/085* (2013.01)
(58) Field of Classification Search
 CPC .................................................. G01C 21/3469
 See application file for complete search history.

(56) References Cited

U.S. PATENT DOCUMENTS

| 5,627,752 A * | 5/1997 | Buck ..................... B60K 26/021 180/65.8 |
| 8,374,781 B2 * | 2/2013 | Hartman ............. G01C 21/3469 701/123 |
| 9,002,632 B1 * | 4/2015 | Emigh .................... G06Q 30/02 340/995.19 |
| 2003/0006914 A1 * | 1/2003 | Todoriki ............... B60L 11/184 340/995.21 |
| 2009/0157289 A1 * | 6/2009 | Graessley ................. B60L 3/12 701/123 |

(Continued)

FOREIGN PATENT DOCUMENTS

| JP | 2002-350152 A | 12/2002 |
| JP | 2003-160199 A | 6/2003 |

(Continued)

OTHER PUBLICATIONS

Japanese OA, Application No. JP2014012636, dated Dec. 8, 2015.

*Primary Examiner* — Truc M Do
(74) *Attorney, Agent, or Firm* — Squire Patton Boggs (US) LLP (57) ABSTRACT

The fuel replenishment amount to a vehicle at each time is collected by a support server 10 through a smartphone 20. Then, information corresponding to calculation results such as the fuel remaining amount based on the information collected by the support server 10 is transmitted to a user through the smartphone 20. Thus, even when a terminal for transmitting the fuel replenishment amount to the smartphone 20 is not installed at a fuel supply station, information meaningful to the user in making a driving plan for the vehicle, such as the fuel remaining amount of the vehicle, can be provided to the user through this smartphone 20 at an appropriate timing.

15 Claims, 6 Drawing Sheets

(56) References Cited

U.S. PATENT DOCUMENTS

| | | | | |
|---|---|---|---|---|
| 2010/0106352 A1* | 4/2010 | Skaff | ............... | B60K 6/445 |
| | | | | 701/22 |
| 2010/0323715 A1* | 12/2010 | Winters | ............... | G01S 5/0027 |
| | | | | 455/456.1 |
| 2011/0288765 A1* | 11/2011 | Conway | ............... | G01C 21/3469 |
| | | | | 701/533 |
| 2011/0307165 A1* | 12/2011 | Hiestermann | ............... | G01C 21/32 |
| | | | | 701/119 |
| 2011/0313647 A1* | 12/2011 | Koebler | ............... | B60L 15/2045 |
| | | | | 701/123 |
| 2012/0004838 A1* | 1/2012 | Lee | ............... | G01C 21/3469 |
| | | | | 701/123 |
| 2012/0109508 A1* | 5/2012 | Rothschild | ............... | G01C 21/3484 |
| | | | | 701/400 |
| 2012/0179362 A1* | 7/2012 | Stille | ............... | G01C 21/3469 |
| | | | | 701/410 |
| 2012/0310525 A1* | 12/2012 | Sengoku | ............... | G01C 21/3469 |
| | | | | 701/423 |
| 2013/0173084 A1* | 7/2013 | Tagawa | ............... | G06F 17/00 |
| | | | | 701/1 |
| 2013/0179007 A1* | 7/2013 | Dalum | ............... | H01M 16/006 |
| | | | | 701/2 |

FOREIGN PATENT DOCUMENTS

| | | |
|---|---|---|
| JP | 2005163584 A | 6/2005 |
| JP | 2013161249 A | 8/2013 |
| JP | 2013237424 A | 11/2013 |
| WO | 2013179983 A1 | 12/2013 |

* cited by examiner

SUPPORT SERVER, MOBILE TERMINAL, AND SUPPORT SYSTEM

BACKGROUND OF THE INVENTION

1. Field of the Invention

The present invention relates to a system for providing information regarding the energy remaining amount of a vehicle using the function of a mobile terminal cooperating with the vehicle.

2. Description of the Related Art

There is proposed a technique in which, after completion of the supply of fuel to a vehicle at a fuel supply station, the vehicle is caused to receive data on the fuel replenishment amount from this fuel supply station, and to calculate and output fuel consumption data based on the received data (see Japanese Patent Application Publication No. 2003-160199). There is also proposed a technique for discriminating one fuel consumption information from another for each location point or route in terms of convenience and entertainment, and displaying the fuel consumption information on a user terminal such as a cell-phone in a manner to be superimposed on map information (see Japanese Patent Application Publication No. 2002-350152).

SUMMARY OF THE INVENTION

However, consideration for improving the convenience of a vehicle using the function of a smartphone is insufficient.

Therefore, it is an object of the present invention to provide a system and the like capable of using the function of a mobile terminal such as a smartphone more effectively to improve the convenience of a vehicle.

A support server of the present invention is characterized by including: a first server arithmetic processing element configured to recognize an energy replenishment amount to a vehicle input to a mobile terminal and a cumulative travel distance acquired by the mobile terminal from the vehicle based on communication with the mobile terminal cooperating with the vehicle when a first specified condition is met, and then in order to calculate a traveling energy efficiency of the vehicle based on recognition results; and a second server arithmetic processing element configured to cause the mobile terminal to recognize the traveling energy efficiency of the vehicle calculated by the first server arithmetic processing element and at least one piece of information determined based on the traveling energy efficiency based on communication with the mobile terminal when a second specified condition is met.

A mobile terminal of the present invention is a mobile terminal cooperating with a vehicle, characterized by including: a first mobile arithmetic processing element configured to determine whether a first specified condition is met, recognize an energy replenishment amount to the vehicle and a cumulative travel distance of the vehicle input through a manipulation of the mobile terminal on condition that the determination result is affirmative, and cause a support server to recognize the energy replenishment amount and cumulative travel distance of the vehicle; and a second mobile arithmetic processing element configured to determine whether a second specified condition is met, and recognize and output the traveling energy efficiency of the vehicle calculated by the support server according to the energy replenishment amount and cumulative travel distance of the vehicle, and at least one piece of information determined according to the traveling energy efficiency based on communication with the support server on condition that the determination result is affirmative.

A support system of the present invention is characterized by including the support server and the mobile terminal.

DESCRIPTION OF THE PREFERRED EMBODIMENTS (Configuration)

Figure 1:
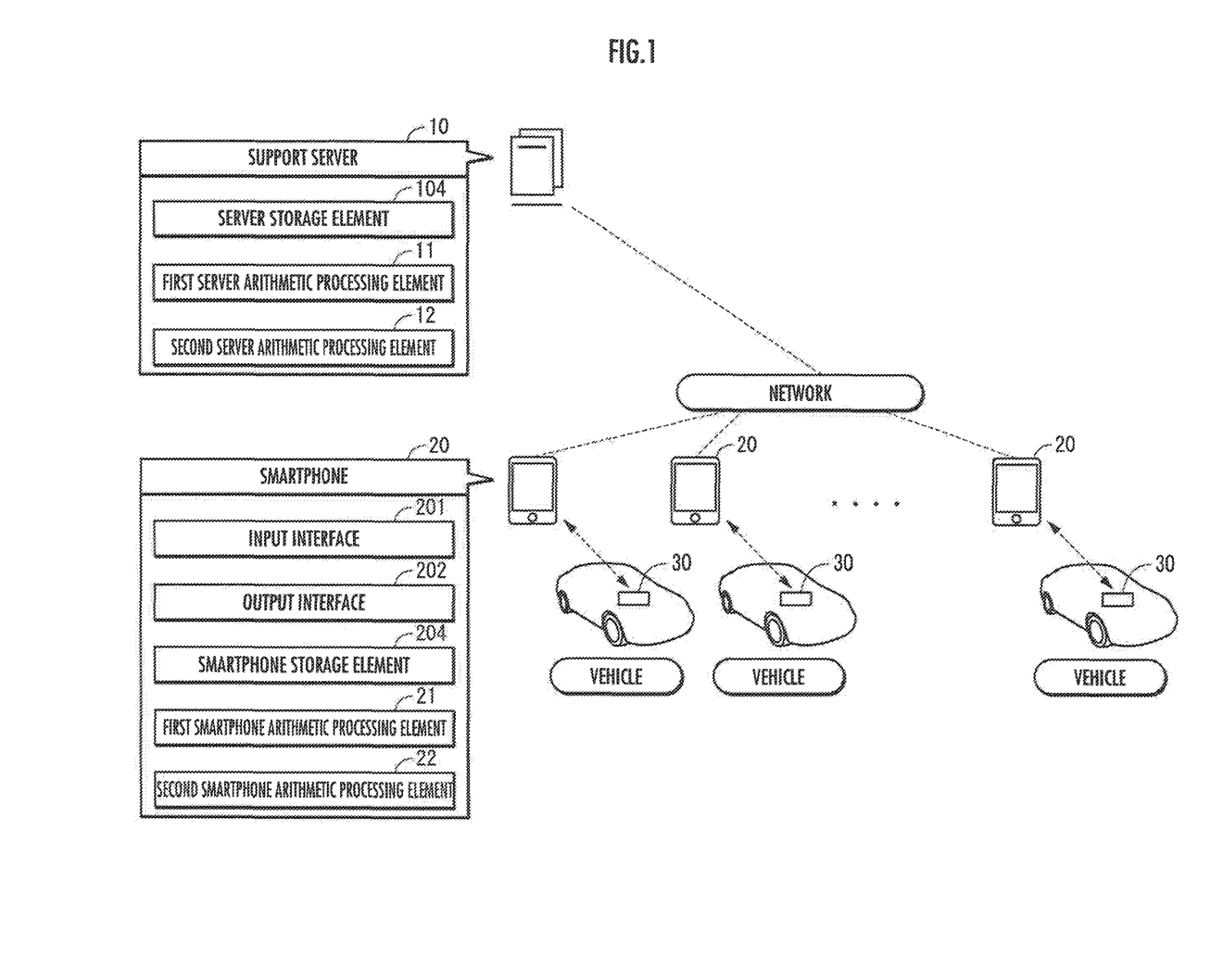
FIG. 1 is a configuration explanatory diagram of a support server of the present invention.

A support system shown in FIG. 1 is configured to include a support server 10 and smartphones (mobile terminals) 20 communicable with each other through a network. In addition to the smartphones 20, the mobile terminals may be all kinds of information processing terminals, such as tablet terminals, designed to have a size and weight capable of being carried by users. Although the embodiments will be described in a case where the vehicle traveling energy is fuel (gasoline or fuel cell gas for a fuel cell vehicle), the same applies to a case where the traveling energy is electricity.

The support server 10 includes a server storage element 104, a first server arithmetic processing element 11, and a second server arithmetic processing element 12. The server storage element 104 is configured to memory-hold or store various data, such as a support map including a road network composed of multiple links, as well as a vehicle identifier and fuel remaining amount of a vehicle identified by this vehicle identifier. The first server arithmetic processing element 11 and the second server arithmetic processing element 12 are configured by a CPU (arithmetic processing unit) and a memory (server storage element) that constitute the support server 10, and to perform arithmetic processing to be described later.

Each smartphone 20 has a self-position measurement function using a GPS and a function for communication with external devices including the support server 10. The smartphone 20 includes an input interface 201, an output interface 202, a smartphone storage element 204, a first smartphone arithmetic processing element 21 (first mobile arithmetic processing element), and a second smartphone arithmetic processing element 22 (second mobile arithmetic processing element).

The input interface 201 is made up of touch panel switches integrally formed with a display to enable user's information input and commands to the smartphone 200. This enables various operations on the smartphone 20, such as taps (single tap, double tap, and long tap), flicks (upward flick, downward flick, left flick, and right flick), swipe, pinches (pinch-in and pinch-out) or multitouch, or the like. The input interface 201 may also be made up of a microphone (voice input device) that constitutes a speech recognition system or a camera (imaging device) that constitutes a motion recognition system such as a hand gesture recognition system, or the like.

The output interface 202 is made up of the display. The output interface 202 may also be made up of light-emitting elements such as LEDs or a speaker (audio output device).

The smartphone storage element 204 is configured to memory-hold or store various data, such as a support map including a road network composed of multiple links, as well as a vehicle identifier and fuel remaining amount of a vehicle identified by this vehicle identifier.

The first smartphone arithmetic processing element 12 and the second smartphone arithmetic processing element 22 are made up of a computer (having one or more CPUs (arithmetic processing units or processors) and a memory (smartphone storage element)) that constitute the smartphone 20, and are configured to perform arithmetic processing to be described later.

A constituent element of the present invention configured to perform corresponding information arithmetic processing means that the constituent element is programmed to read programs (including application software (hereinafter referred to as "application")) from the memory and perform the corresponding information arithmetic processing according to the programs.

The constituent element of the present invention "recognizes" information, and this means that the constituent element performs at least part of arithmetic processing for making the information available, such as that the constituent element receives information, retrieves or reads the information from an internal or external storage device, performs arithmetic processing on basic information retrieved or the like to calculate or estimate the information, and stores the information in a storage device.

When an ignition switch of the vehicle is in ACC position or ON position, power is supplied to an ECU 30 (an in-vehicle controller composed of a CPU, a memory such as a ROM, and the like) from an on-vehicle battery. In this state, when the smartphone 20 exists in a range communicable with the ECU 30 such as the cabin space of the vehicle, cooperation between the smartphone 20 and the vehicle (exactly the in-vehicle ECU 30) is established after authentication of the smartphone 20 and the vehicle (exactly the ECU 30) by communication. The cooperation between the smartphone 20 and the vehicle enables communication between the smartphone 20 and the vehicle, and communication between the vehicle and external devices such as the support server 10 through the smartphone 20. The establishment of communication between the smartphone 20 and the vehicle enables one terminal (e.g. the vehicle) to transmit the arithmetic processing result to the other terminal (e.g. the smartphone 20) and the other terminal to output the arithmetic processing result or perform further arithmetic processing based on the arithmetic processing result.

Operation (First Embodiment)

The operation of the support system as a first embodiment of the present invention will be described.

Figure 2:
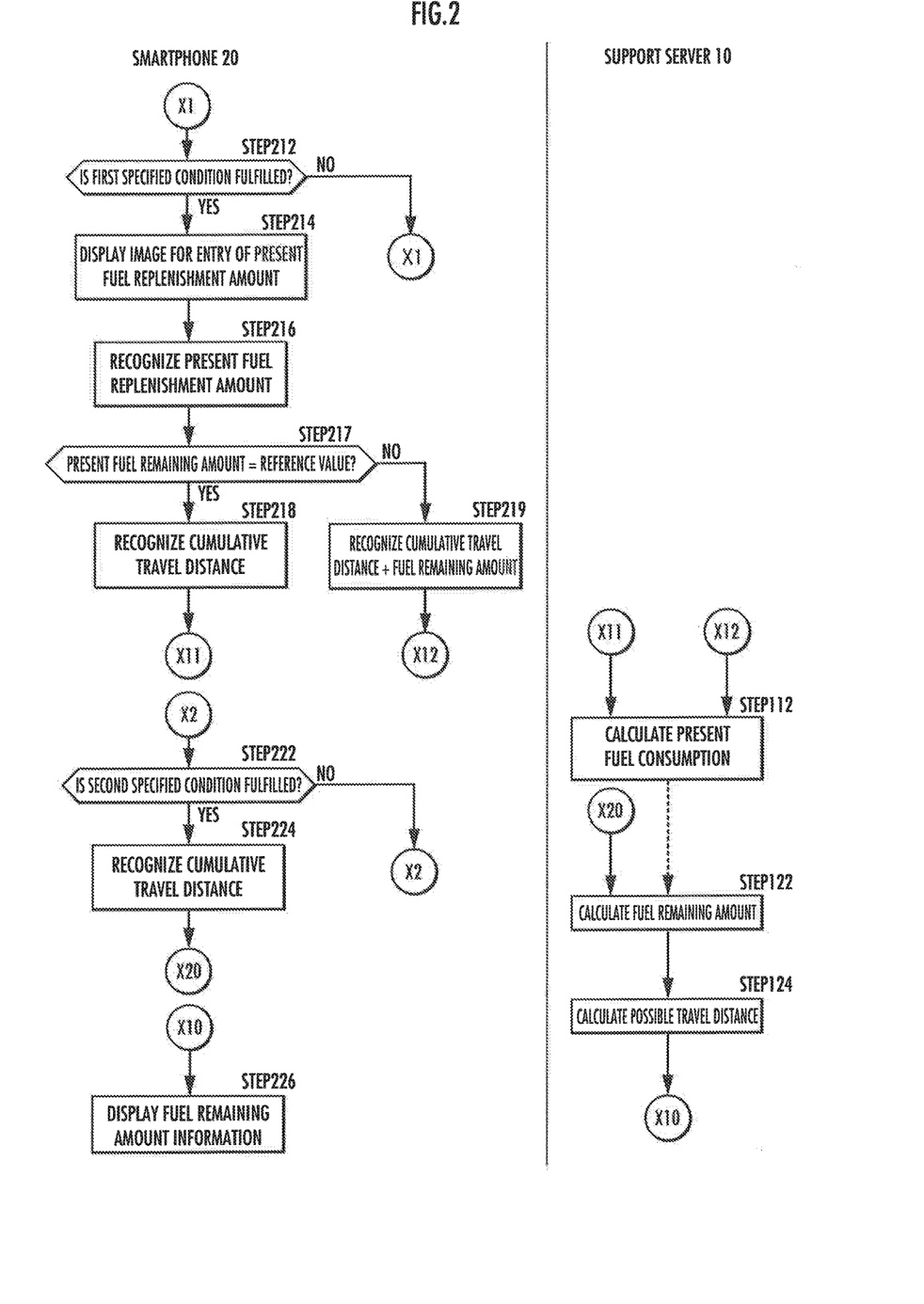
FIG. 2 is a function explanatory chart (first embodiment) of the support server of the present invention.

When the smartphone 20 and the vehicle are in cooperation with each other, the first smartphone arithmetic processing element 21 determines whether a first specified condition is met (STEP 212 in FIG. 2). The "first specified condition" means it is highly probable that fuel is supplied (or has been supplied) to the vehicle. Specifically, the fact that an application for receiving a fuel remaining amount notification service is started on the smartphone 20 is defined as the first specified condition.

The fact that a fuel supply port of the vehicle is opened (or closed) may also be defined as the first specified condition. Opening/closing of the fuel supply port is detected by a proper switch, and the detection signal is transmitted to the smartphone 20 through the ECU 30. In this case, the cooperation between the smartphone 20 and the vehicle needs to be established.

The fact that the current position of the vehicle measured by the GPS function of the smartphone 20 is where the vehicle has parked in an area corresponding to a fuel supply station for a predetermined time or more may further be defined as the first specified condition. The area corresponding to the fuel supply station forms part of a smartphone map stored in the storage device of the mobile terminal as an area defined by two or more global coordinate values (latitude and longitude). The predetermined time is preset in view of the amount of time required for common fuel supply. In this case, the smartphone 20 and the vehicle do not need to be cooperated with each other, and if the smartphone 20 is in the power-on state, the fulfillment of the first specified condition can be determined.

When the smartphone 20 has a credit payment function, the fact that a payment to the fuel supply station has been made on credit may further be defined as the first specified condition. Upon payment, code (payment recipient identifier) is recognized by communication with a payment recipient terminal, and the fuel supply station is identified as the payment recipient based on the code. Even in this case, the smartphone 20 and the vehicle do not need to be cooperated with each other, and if the smartphone 20 is in the power ON state, the fulfillment of the first specified condition can be determined.

Figure 3A:
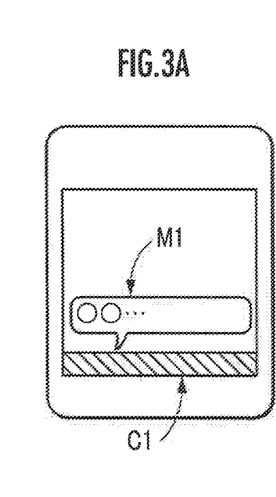
FIG. 3A is an illustration relating to a display manner of a message for urging the entry of the fuel replenishment amount and an icon representing a level of the fuel replenishment amount.
Figure 3B:
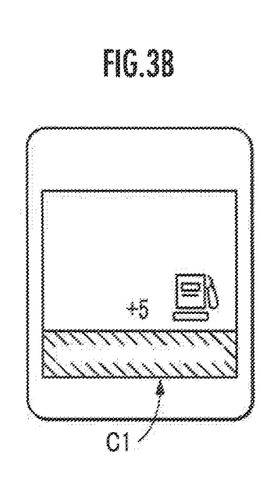
FIG. 3B is an illustration relating to a first output manner of the present fuel replenishment amount.
Figure 3C:
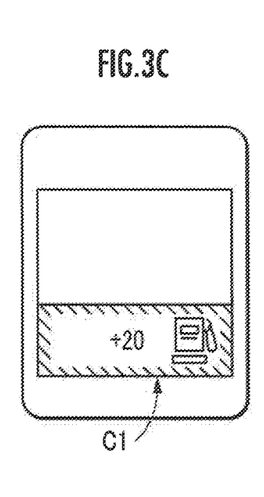
FIG. 3C is an illustration relating to a second output manner of the present fuel replenishment amount.
Figure 3D:
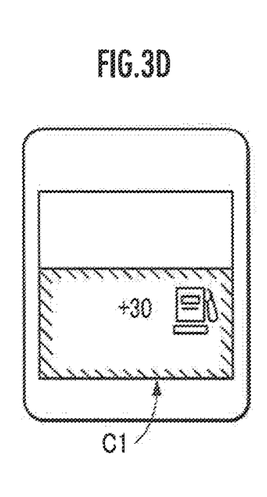
FIG. 3D is an illustration relating to a third output manner of the present fuel replenishment amount.
Figure 3E:
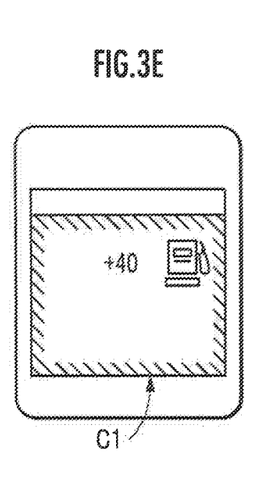
FIG. 3E is an illustration relating to a fourth output manner of the present fuel replenishment amount.

When it is determined that the first specified condition is met (YES in STEP 212 of FIG. 2), the first smartphone arithmetic processing element 21 causes the display to output an image that makes up an input interface for a fuel replenishment amount (STEP 214 in FIG. 2). This leads to displaying not only a message M1 to urge the entry of the fuel replenishment amount on a display that constitutes the output interface 202 but also a horizontally long rectangular icon C1 on the display as shown in FIG. 3A. This icon is enlarged by a swipe (an operation to slide a finger tip on the display like drag and drop) by an amount corresponding to the operation amount in the longitudinal direction. The longitudinal level (long/short) of the icon C1 represents the level of the fuel replenishment amount. In other words, the icon C1 makes up the input interface 201 for the fuel replenishment amount by the swipe.

The present fuel replenishment amount is input to the smartphone 20 through the input interface 201, and the input information is recognized by the first smartphone arithmetic processing element 21 (STEP 216 in FIG. 2). For example, as shown in FIG. 3B to FIG. 3E, respectively, a number (the unit is L) corresponding to the longitudinal length of the icon C1 enlarged by drag and drop corresponds to the recognition result. As the method of inputting the fuel replenishment amount, any of various operation modes of the smartphone 20 not only the swipe, but also tap, flick, pinch, or multi-touch, or a combination of thereof can be adopted. Instead of or in addition to the touch gesture such as swipe, a corresponding hand gesture or speech such as to say "●● L of fuel has been replenished" may be input through the input interface 201 (motion recognition system or microphone). Further, instead of or in addition to the enlarged display of the icon C1 on the display, the number of light-emitting elements emitting light among the multiple light-emitting elements may be increased or speech such as to say "●● of fuel was replenished this time" may be output through the output interface 202 (speaker).

Instead of the fuel replenishment amount, information capable of identifying the fuel replenishment amount, such as the current credit payment amount at the fuel supply station this time and the unit fuel cost as needed, may be input to the smartphone 20. In this case, the present fuel replenishment amount can be calculated or recognized by the first smartphone arithmetic processing element 21 or the first server arithmetic processing element 11 based on the information.

It is confirmed whether fuel was replenished until the fuel remaining amount in a fuel tank reached a reference value (until the fuel tank was filled up) (STEP 217 in FIG. 2). Specifically, a message for the confirmation is output to the output interface 202 to make the confirmation through a user's operation via the input interface 201.

When the determination result is affirmative (YES in STEP 217 of FIG. 2), the first smartphone arithmetic processing element 21 recognizes a cumulative travel distance of the vehicle at the time (STEP 218 in FIG. 2). For example, the first smartphone arithmetic processing element 21 recognizes the cumulative travel distance measured by an odometer of the vehicle based on communication with the ECU 30. The cumulative travel distance of the vehicle may also be measured in such a manner that, after links on which the vehicle has traveled are identified by the GPS function of the smartphone 20 based on a smartphone map, the distances (lengths) of the links recognized from this smartphone map are accumulated or added up. On that basis, the first smartphone arithmetic processing element 21 causes the first server arithmetic processing element 11 to recognize the cumulative travel distance and the fuel replenishment amount based on communication with the support server 100 (Arrow X11 in FIG. 2).

On the other hand, when the determination result is negative (NO in STEP 217 of FIG. 2), the first smartphone arithmetic processing element 21 acquires, from the cooperating vehicle, the fuel remaining amount measured by a fuel gauge in addition to the cumulative travel distance (STEP 219 in FIG. 2). On that basis, the first smartphone arithmetic processing element 21 causes the first server arithmetic processing element 11 to recognize the cumulative travel distance and the fuel remaining amount together with the fuel replenishment amount based on communication with the support server 100 (Arrow X12 in FIG. 2).

Note that, when the determination result is negative (NO in STEP 217 of FIG. 2), only the cumulative travel distance and fuel replenishment amount of the vehicle may be recognized by the first server arithmetic processing element 11 together with attached information indicative of the negative determination result like in the case where the determination result is affirmative (see Arrow X11 in FIG. 2). Further, the determination processing (STEP 217 in FIG. 2) may be omitted.

The vehicle fuel consumption (vehicle travel distance per fuel unit amount) is calculated by the first support arithmetic processing element 11 based on information recognized based on communication with the smartphone 20 (STEP 112 in FIG. 2).

Specifically, the present fuel consumption $E(k)=\Delta D(k)/f(k)$ is calculated by dividing, by the present fuel replenishment amount $f(k)$, a deviation $\Delta D(k)=D(k)-D(k-1)$ between respective cumulative travel distances of the vehicle at the last fuel supply time $t(k-1)$ and the present fuel supply time $t(k)$ based on the cumulative travel distance and the fuel replenishment amount as the recognized information (see Arrow X11 in FIG. 2).

Instead of this, the present fuel consumption $E(k)=\Delta D(k)/\{\Delta F(k)+f(k)\}$ is calculated by dividing the deviation $\Delta D(k)$ between the cumulative travel distances by the sum of a deviation $\Delta F(k)$ of the present fuel remaining amount $F(k)$ from the last fuel remaining amount $F(k-1)$ (or a reference value $F+$) and the present fuel replenishment amount $f(k)$ based on the cumulative travel distance, the fuel replenishment amount, and the fuel remaining amount as the recognized information (see Arrow X12 in FIG. 2).

It is then determined by the second smartphone arithmetic processing element 22 whether a second specified condition is met (STEP 222 in FIG. 2). The "second specified condition" means that a trigger event for displaying the fuel remaining amount of the vehicle on the output interface 202 of the smartphone 20 has occurred. For example, the fact that a predetermined application such as a navigation application or a POI search application is started on the smartphone 20 with an operation on the input interface 202, or the fact that a command for displaying the fuel remaining amount is input is defined as the second specified condition. The fact that the cumulative travel distance (see STEP 218, 219, and STEP 224 in FIG. 2) and the vehicle fuel consumption (see STEP 112 in FIG. 2) are recognized intermittently on the smartphone 20, the amount of fuel consumption or the reduction amount is estimated intermittently based on the latest fuel consumption, and the fuel remaining amount based on the estimation result is determined to be lower than or equal to the lowest reference value may be defined as the second specified condition. The second specified condition may further be the same condition as the first specified condition.

When it is determined that the second specified condition is met (YES in STEP 222 of FIG. 2), the second smartphone arithmetic processing element 22 recognizes the cumulative travel distance at the time (STEP 224 in FIG. 2), and causes the second server arithmetic processing element 12 to recognize the cumulative travel distance of the vehicle at the time based on communication with the support server 10 (Arrow X20 in FIG. 2).

The fuel remaining amount of the vehicle at the time is calculated by the second server arithmetic processing element 12 (STEP 122 in FIG. 2). Specifically, a product of a difference $\Delta D(j(k))$ between a cumulative travel distance $D(k)$ of this vehicle at the time of the last fuel supply stored in the server storage element 104 and a cumulative travel distance $D(j(k))$ newly received, and a last-calculated fuel consumption $E(k)$, is calculated. On that basis, the product ΔD(j(k))×E(k) is subtracted from the reference value F+ (or the last fuel remaining amount F(k)) to calculate the fuel remaining amount F(j(k)).

Then, a possible travel distance of the vehicle at the time is calculated by the second server arithmetic processing element 12 (STEP 124 in FIG. 2). Specifically, a product of the fuel remaining amount F(j(k)) (or a value obtained by subtracting the lowest reference value F− of the fuel remaining amount therefrom) and the last-calculated fuel consumption E(k), is calculated as the possible travel distance D+(j(k))=F(j(k))×E(k) (or {F(j(k))−F−}×E(k)).

The second server arithmetic processing element 12 causes the second smartphone arithmetic processing element 22 to recognize the calculation results of the fuel remaining amount and the possible travel distance based on communication with the smartphone 20 (Arrow X10 in FIG. 2). The second smartphone arithmetic processing element 22 causes the output interface 202 to display information or an image according to the fuel remaining amount and the possible travel distance (STEP 226 in FIG. 2). Note that, after the fuel remaining amount and the fuel consumption are recognized by the second smartphone arithmetic processing element 22, the calculation of the possible travel distance of the vehicle by the second server arithmetic processing element 12 (see STEP 124 in FIG. 2) may be made alternatively. A predetermined manner of input to the smartphone 20 through the input interface 201 after the second smartphone arithmetic processing element 22 recognizes the calculation results of the fuel remaining amount and the possible travel distance may be set as a requirement for displaying the information or the image on the output interface 202.

Figure 4A:
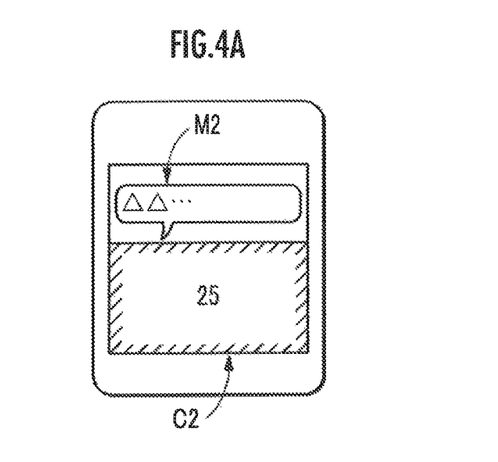
FIG. 4A is an illustration relating to a first output manner of the fuel remaining amount in the first embodiment.

This leads to displaying, on the output interface 202, a rectangular icon C2 having a longitudinal level varying with the level of the fuel remaining amount and an image M2 including a number indicative of the possible travel distance as shown in FIG. 4A.

Figure 4B:
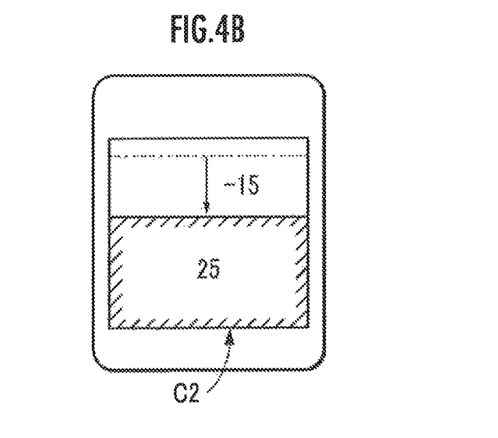
FIG. 4B is an illustration relating to a second output manner of the fuel remaining amount in the first embodiment.

Here, as indicated by the arrow in FIG. 4B, the icon C2 may be displayed dynamically to be reduced from a length corresponding to the last fuel remaining amount (including the fuel remaining amount used in the fuel consumption calculation (see STEP 112 in FIG. 2)) to a length corresponding to the present fuel remaining amount. The fuel remaining amount may be output through the output interface 202 in every mode to draw more user's attention, such that the enlargement and reduction speed of the icon may become faster or the brightness of the icon increases as the reduction ratio of the present fuel remaining amount to the last fuel remaining amount increases. Audio output may be included as the output in a manner to differentiate the sound volume or the musical scale according to the level of reduction in the remaining amount. When it is not confirmed that the fuel remaining amount has reached the reference value after the last fuel replenishment, the fuel remaining amount may be output through the output interface 202 in a manner to draw more user's attention compared to the case when it is confirmed that the fuel remaining amount has reached the reference value after the last fuel replenishment.

Figure 4C:
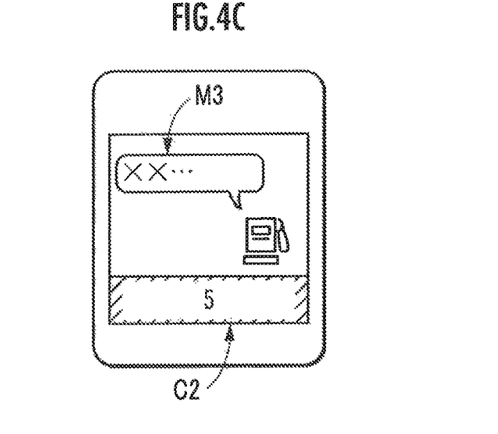
FIG. 4C is an illustration relating to a third output manner of the fuel remaining amount in the first embodiment.

When the second smartphone arithmetic processing element 22 recognizes that the fuel remaining amount is lower than or equal to the lowest reference value, the display may be such that the length level of the icon C2 is adjusted to be lower than or equal to a length corresponding to the lowest reference value for the fuel remaining amount and highlighted as shown in FIG. 4C with a message M3 for urging fuel replenishment displayed through the output interface 202. The message may be output intact as audio output or uttered, or speech may be output to draw user's attention simultaneously with the display of the message.

Operation (Second Embodiment)

The operation of the support system as a second embodiment of the present invention will be described. Since arithmetic processing in STEP 212 to STEP 219 and STEP 112 is the same as that in the first embodiment, the description thereof will be omitted, and only arithmetic processing after the arithmetic processing will be described.

Figure 5:
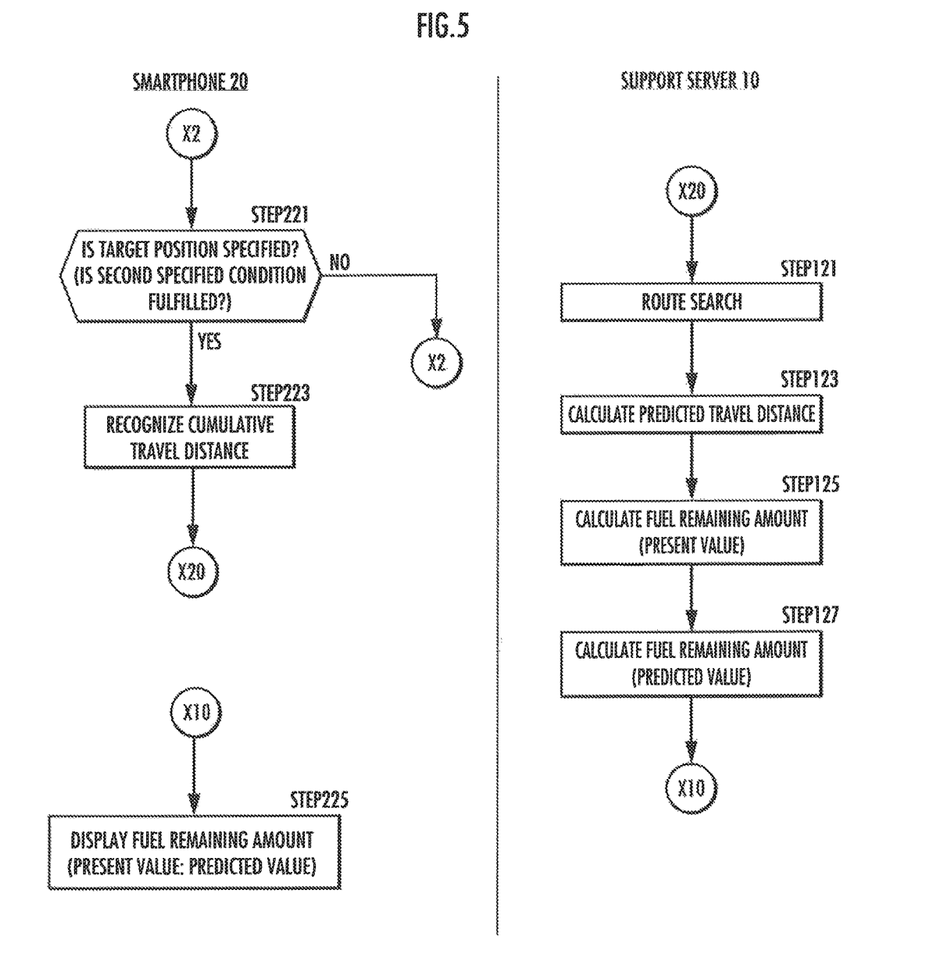
FIG. 5 is a function explanatory chart (second embodiment) of the support server of the present invention.

According to the function of the navigation application of the smartphone 20, the second smartphone arithmetic processing element 22 determines whether a condition that a target position is specified by the user through the input interface 201 is met as the "second specified condition" or an alternative condition thereof (STEP 221 in FIG. 5).

When the determination result is affirmative (YES in STEP 221 of FIG. 5), the cumulative travel distance of the vehicle at the time is recognized by the second smartphone arithmetic processing element 22 (STEP 223 in FIG. 5 (see STEP 222 in FIG. 2)).

Then, the second smartphone arithmetic processing element 22 causes the second server arithmetic processing element 12 to recognize the specified target position, the current position, and the cumulative travel distance based on communication with the support server 10 (Arrow X2 in FIG. 5).

In response, the second server arithmetic processing element 12 searches for a route from the current position to the target position based on a server map stored in the server storage element 104 (STEP 121 in FIG. 5). One route may be selected from among two or more searched routes from the standpoint of the shortest distance or travel time.

A predicted travel distance of the vehicle according to the searched route is calculated by the second server arithmetic processing element 12 (STEP 123 in FIG. 5). Specifically, the respective lengths of multiple links that make up the route are recognized based on the server route, and the predicted travel distance is calculated by adding up the lengths.

The fuel remaining amount (present value) of the vehicle is calculated by the second server arithmetic processing element 12 (STEP 125 in FIG. 5 (see STEP 122 in FIG. 2)).

The fuel remaining amount at the time when the vehicle arrives at the target position is predicted by the second server arithmetic processing element 12 (STEP 127 in FIG. 5). Specifically, the amount of fuel consumption is predicted by dividing the predicted travel distance of the vehicle by the last-calculated fuel consumption. On that basis, a fuel remaining amount (predicted value) is calculated by subtracting the predicted value of the amount of fuel consumption from the fuel remaining amount (present value).

The second server arithmetic processing element 12 causes the second smartphone arithmetic processing element 22 to recognize the calculation results of the present value and the predicted value of the fuel remaining amounts in addition to the searched route based on communication with the smartphone 20 (Arrow X10 in FIG. 5).

In response, the second smartphone arithmetic processing element 22 causes the output interface 202 to display images corresponding to the searched route and the present value and the predicted value of the fuel remaining amounts (STEP 225 in FIG. 5). Like in the first embodiment, a predetermined manner of input to the smartphone 20 through the input interface 201 after the second smartphone arithmetic processing element 22 recognizes the searched route and the calculation results of the present value and the predicted value of the fuel remaining amounts may be set as a requirement for displaying the images on the output interface 202.

Figure 6A:
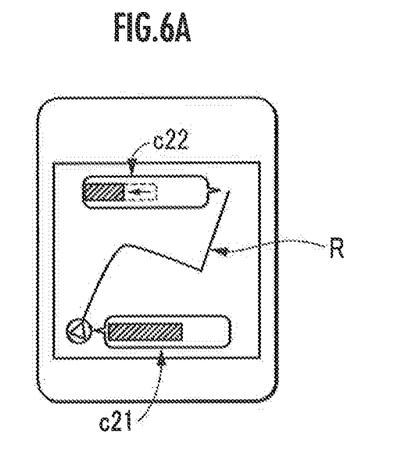
FIG. 6A is an illustration relating to a first output manner of the fuel remaining amount in the second embodiment.

This leads to superimposing and displaying, on the smartphone map, a searched route R from the current position to the target position of the vehicle as shown in FIG. 6A, for example. Further, a rectangular icon C21 having a longitudinal level varying with the level of the fuel remaining amount (present value) is displayed on the output interface 202 in association with the current position (the start point of the route R). Then, a rectangular icon C22 having a longitudinal level varying with the level of the fuel remaining amount (predicted value) is displayed on the output interface 202 in association with the target position (the end point of the route R). The fuel remaining amount (predicted value) may be output through the output interface 202 in any manner easy to draw more user's attention, such as to be displayed dynamically that the icon C22 will be recognized as the result of reducing the icon C21 (see FIG. 4B).

When the second server arithmetic processing element 12 or the second smartphone arithmetic processing element 22 recognizes that the fuel remaining amount (predicted value) is lower than or equal to the lowest reference value F− for the fuel remaining amount, the possible travel distance may be calculated (see STEP 124 in FIG. 2). On that basis, an intermediate position corresponding to the possible travel distance on the searched route may be recognized and displayed on the output interface 202.

Figure 6B:
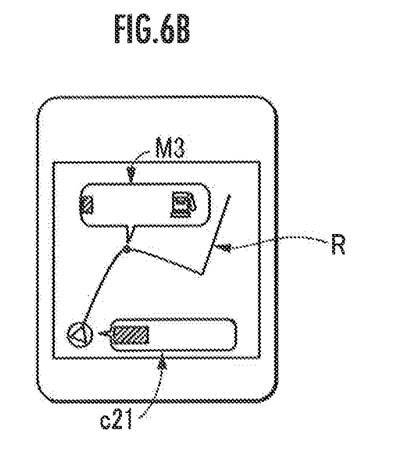
FIG. 6B is an illustration relating to a second output manner of the fuel remaining amount in the second embodiment.

This leads to displaying the intermediate position on the smartphone map as shown in FIG. 6B. In addition to this, a message M3 for urging fuel replenishment is displayed through the output interface 202 (see FIG. 4C).

(Effects)

According to the support system fulfilling the above functionality, an information input function and an information output function implemented by the input interface 201 and the output interface 202 of the smartphone 20 are effectively used.

Specifically, the fuel replenishment amount to the vehicle at each time is collected by the support server 10 through the smartphone 20 (see STEP 212 to STEP 219 and STEP 112 in FIG. 2, and FIG. 3). Then, information corresponding to the calculation results such as the fuel remaining amount based on the information collected by the support server 10 is transmitted to the user through the smartphone 20 (see STEP 222 to STEP 226 and STEP 122 to STEP 124 in FIG. 2, FIG. 4, and FIG. 6).

Thus, even when a terminal for transmitting the fuel replenishment amount to the smartphone 20 is not installed at the fuel supply station, information meaningful to the user in making a driving plan for the vehicle, such as the fuel remaining amount of the vehicle, can be provided to the user through this smartphone 20 at an appropriate timing. This can promote effective use of the function of the smartphone 20 to further improve the convenience of the vehicle.

Other Embodiments of the Present Invention

In the first embodiment, the calculation of the fuel remaining amount F(j(k)) based on the cumulative travel distance D(j(k)) and the latest fuel consumption E(k) of the vehicle at the time when the second specified condition is met (see STEP 122 in FIG. 2) may be made by the second smartphone arithmetic processing element 22. In this case, when the second specified condition is met, the second smartphone arithmetic processing element 22 is configured to recognize the latest fuel consumption E(k) of the vehicle calculated by the first server arithmetic processing element 11 based on communication with the support server 10, and then to calculate the fuel remaining amount F(j(k)) based on the cumulative travel distance D(j(k)) of the vehicle at that time in addition to the recognition result.

In the second embodiment, part of or all of the route search up to the target position (see STEP 121 in FIG. 5), the calculation of the predicted travel distance of the vehicle at the target position (see STEP 123 in FIG. 5), the calculation of the fuel remaining amount (present value) (see STEP 125 in FIG. 5), and the calculation of the fuel remaining amount (predicted value) (see STEP 127 in FIG. 5) may be made by the second smartphone arithmetic processing element 22. In this case, the information necessary to perform the arithmetic processing is recognized by the second smartphone arithmetic processing element 22 based on communication with the support server 10, and the step of causing the support server 10 to recognize information (e.g., the cumulative travel distance of the vehicle (see STEP 223 in FIG. 5)) unnecessary to perform the arithmetic processing are omitted.

Further, as an additional first specified condition, it may be determined whether a condition that it is highly probable that a state of urging the user to manipulate the smartphone 20 is appropriate is met. For example, the fact that the vehicle has parked at the fuel supply station for a predetermined period of time is defined as the condition. This avoids such a situation that a user driving a vehicle is urged to manipulate the smartphone 20.

The fact that information arithmetic processing according to an application installed on the smartphone 20 is being performed may also be defined as the condition. As such an application, a support navigation application for making a search for a route to a destination or a POI search application for collecting POI information belonging to a specified category around the current position is cited.

What is claimed is:

1. A support server comprising:
   at least one processor; and
   at least one memory including computer program code,
   wherein the at least one memory and the computer program code are configured to, with the at least one processor, cause the support server at least to:
   recognize an energy replenishment amount to a vehicle input to a mobile terminal and a cumulative travel distance acquired by the mobile terminal from the vehicle based on communication with the mobile terminal cooperating with the vehicle in a case where a first specified condition is met, and then calculate traveling energy efficiency of the vehicle based on the recognition results; and
   cause the mobile terminal to recognize the traveling energy efficiency of the vehicle and at least one piece of information determined based on the traveling energy efficiency based on communication with the mobile terminal in a case where a second specified condition is met,
   wherein the first specified condition represents that energy for traveling has been supplied to the vehicle, and
   wherein the second specified condition represents a trigger event that has been detected by the mobile terminal.

2. The support server according to claim 1, wherein the at least one memory and the computer program code are further configured to, with the at least one processor, cause the support server at least to recognize the cumulative travel distance of the vehicle recognized by the mobile terminal based on communication with the mobile terminal in a case where the second specified condition is met, calculate a present value of an energy remaining amount in the vehicle as information determined based on the traveling energy efficiency and the cumulative travel distance of the vehicle, and cause the mobile terminal to recognize the present value of the energy remaining amount in the vehicle.

3. The support server according to claim 1, wherein the at least one memory and the computer program code are further configured to, with the at least one processor, cause the support server at least to recognize a target position and search for a route to the target position as an end point based on communication with the mobile terminal in a case where the second specified condition that the target position for the route search is specified as a trigger event is met, calculate a predicted value of an energy remaining amount in a case where the vehicle travels according to the route, and cause the mobile terminal to recognize the predicted value of the energy remaining amount and information determined according to the predicted value of the energy remaining amount.

4. The support server according to claim 3, wherein in a case where the predicted value of the energy remaining amount is lower than a lowest reference value, the at least one memory and the computer program code are further configured to, with the at least one processor, cause the support server at least to recognize an intermediate position on the route at which the energy remaining amount becomes lower than or equal to the lowest reference value, and cause the mobile terminal to recognize and output the intermediate position as information determined according to the predicted value of the energy remaining amount of the vehicle.

5. A mobile terminal cooperating with a vehicle, comprising:

at least one processor; and at least one memory including computer program code, wherein the at least one memory and the computer program code are configured to, with the at least one processor, cause the mobile terminal at least to:

determine whether a first specified condition is met, recognize an energy replenishment amount to the vehicle and a cumulative travel distance of the vehicle input through a manipulation of the mobile terminal on condition that the determination result is affirmative, and cause a support server to recognize the energy replenishment amount and the cumulative travel distance of the vehicle; and determine whether a second specified condition is met, and recognize and output traveling energy efficiency of the vehicle calculated by the support server according to the energy replenishment amount and the cumulative travel distance of the vehicle, and at least one piece of information determined according to the traveling energy efficiency based on communication with the support server on condition that the determination result is affirmative, wherein the first specified condition represents that energy for traveling has been supplied to the vehicle, and wherein the second specified condition represents a trigger event that has been detected by the mobile terminal.

6. The mobile terminal according to claim 5, wherein the at least one memory and the computer program code are further configured to, with the at least one processor, cause the mobile terminal at least to recognize the cumulative travel distance of the vehicle and cause the support server to recognize the cumulative travel distance of the vehicle based on communication with the support server on condition that it is determined that the second specified condition is met, and recognize and output a present value of an energy remaining amount in the vehicle calculated by the support server according to the cumulative travel distance of the vehicle, and at least one piece of information determined according to the present value of the energy remaining amount.

7. A mobile terminal cooperating with a vehicle, comprising:

at least one processor; and at least one memory including computer program code, wherein the at least one memory and the computer program code are configured to, with the at least one processor, cause the mobile terminal at least to:

determine whether a first specified condition is met, recognize an energy replenishment amount to the vehicle and a cumulative travel distance of the vehicle input through a manipulation of the mobile terminal on condition that the determination result is affirmative, and cause a support server to recognize the energy replenishment amount and the cumulative travel distance of the vehicle;

determine whether a second specified condition is met, and recognize and output traveling energy efficiency of the vehicle calculated by the support server according to the energy replenishment amount and the cumulative travel distance of the vehicle, and at least one piece of information determined according to the traveling energy efficiency based on communication with the support server on condition that the determination result is affirmative;

recognize the cumulative travel distance of the vehicle and cause the support server to recognize the cumulative travel distance of the vehicle based on communication with the support server on condition that it is determined that the second specified condition is met; and recognize and output a present value of an energy remaining amount in the vehicle calculated by the support server according to the cumulative travel distance of the vehicle, and at least one piece of information determined according to the present value of the energy remaining amount, wherein the at least one memory and the computer program code are further configured to, with the at least one processor, cause the mobile terminal at least to dynamically output an image representing a deviation of a present recognition result from a previous recognition result of the energy remaining amount of the vehicle.

8. The mobile terminal according to claim 7, wherein the at least one memory and the computer program code are further configured to, with the at least one processor, cause the mobile terminal at least to dynamically output the image representing the deviation in such a manner that the image changes at a higher speed as the deviation of the present recognition result from the previous recognition result of the energy remaining amount of the vehicle increases.

9. The mobile terminal according to claim 6, wherein in a case where the present recognition result of the energy remaining amount of the vehicle is lower than or equal to a lowest reference value, the at least one memory and the computer program code are further configured to, with the at least one processor, cause the mobile terminal at least to output a message for urging replenishment of traveling energy to the vehicle.

10. The mobile terminal according to claim 5, wherein in a case where the second specified condition that specification of a target position for a route search as a trigger event is detected is met, the at least one memory and the computer program code are further configured to, with the at least one processor, cause the mobile terminal at least to
recognize a predicted value of the energy remaining amount in the vehicle in a case where the vehicle has traveled according to a route to the target position as an end point calculated by the support server, and
output the predicted value of the energy remaining amount and at least one piece of information determined according to the predicted value of the energy remaining amount.

11. A mobile terminal cooperating with a vehicle, comprising:
at least one processor; and
at least one memory including computer program code,
wherein the at least one memory and the computer program code are configured to, with the at least one processor, cause the mobile terminal at least to:
determine whether a first specified condition is met, recognize an energy replenishment amount to the vehicle and a cumulative travel distance of the vehicle input through a manipulation of the mobile terminal on condition that the determination result is affirmative, and cause a support server to recognize the energy replenishment amount and the cumulative travel distance of the vehicle; and
determine whether a second specified condition is met, and recognize and output traveling energy efficiency of the vehicle calculated by the support server according to the energy replenishment amount and the cumulative travel distance of the vehicle, and at least one piece of information determined according to the traveling energy efficiency based on communication with the support server on condition that the determination result is affirmative,
wherein in a case where the second specified condition that specification of a target position for a route search as a trigger event is detected is met, the at least one memory and the computer program code are further configured to, with the at least one processor, cause the mobile terminal at least to
recognize a predicted value of the energy remaining amount in the vehicle in a case where the vehicle has traveled according to a route to the target position as an end point calculated by the support server, and
output the predicted value of the energy remaining amount and at least one piece of information determined according to the predicted value of the energy remaining amount, and
wherein the at least one memory and the computer program code are further configured to, with the at least one processor, cause the mobile terminal at least to dynamically output an image representing a deviation of the predicted value from a present value of the energy remaining amount of the vehicle.

12. The mobile terminal according to claim 11, wherein the at least one memory and the computer program code are further configured to, with the at least one processor, cause the mobile terminal at least to dynamically output the image representing the deviation in such a manner that the image changes at a higher speed as the deviation of the predicted value from the present value of the energy remaining amount of the vehicle increases.

13. The mobile terminal according to claim 10, wherein in a case where the predicted value of the energy remaining amount in the vehicle is lower than a lowest reference value, the at least one memory and the computer program code are further configured to, with the at least one processor, cause the mobile terminal at least to output an intermediate point on the route at which the predicted value of the energy remaining amount in the vehicle becomes lower than or equal to the lowest reference value.

14. The mobile terminal according to claim 13, wherein the at least one memory and the computer program code are further configured to, with the at least one processor, cause the mobile terminal at least to output a message for urging replenishment of traveling energy to the vehicle in association with the intermediate point on the route.

15. A support system comprising a support server and a mobile terminal, wherein
the support server comprises:
at least one processor; and
at least one memory including computer program code,
wherein the at least one memory and the computer program code of the support server are configured to, with the at least one processor, cause the support server at least to:
recognize an energy replenishment amount to a vehicle input to a mobile terminal and a cumulative travel distance acquired by the mobile terminal from the vehicle based on communication with the mobile terminal cooperating with the vehicle in a case where a first specified condition is met, and then to calculate traveling energy efficiency of the vehicle based on the recognition results; and
cause the mobile terminal to recognize the traveling energy efficiency of the vehicle calculated by the first server arithmetic processing element and at least one piece of information determined based on the traveling energy efficiency based on communication with the mobile terminal in a case where a second specified condition is met, and
the mobile terminal comprises:
at least one processor; and
at least one memory including computer program code,
wherein the at least one memory and the computer program code of the mobile terminal are configured to, with the at least one processor, cause the mobile terminal at least to:
determine whether the first specified condition is met, recognize an energy replenishment amount to the vehicle and a cumulative travel distance of the vehicle input through a manipulation of the mobile terminal on condition that the determination result is affirmative, and cause the support server to recognize the energy replenishment amount and the cumulative travel distance of the vehicle; and
determine whether the second specified condition is met, and recognize and output the traveling energy efficiency of the vehicle calculated by the support server according to the energy replenishment amount and the cumulative travel distance of the vehicle, and at least one piece of information determined according to the traveling energy efficiency based on communication with the support server on condition that the determination result is affirmative, wherein the first specified condition represents that energy for traveling has been supplied to the vehicle, and wherein the second specified condition represents a trigger event that has been detected by the mobile terminal.

\* \* \* \* \*